United States Patent Office 3,424,075
Patented Jan. 28, 1969

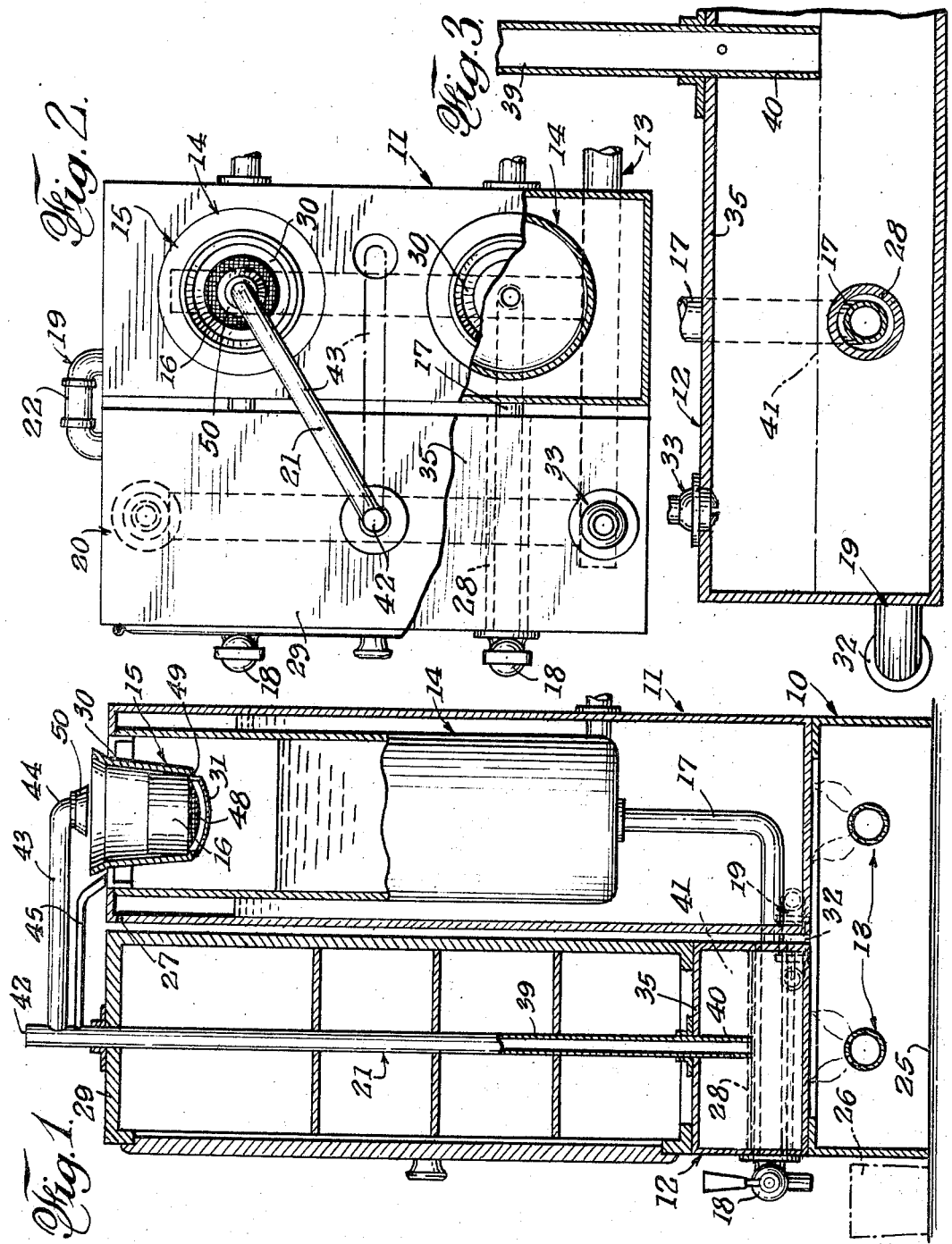

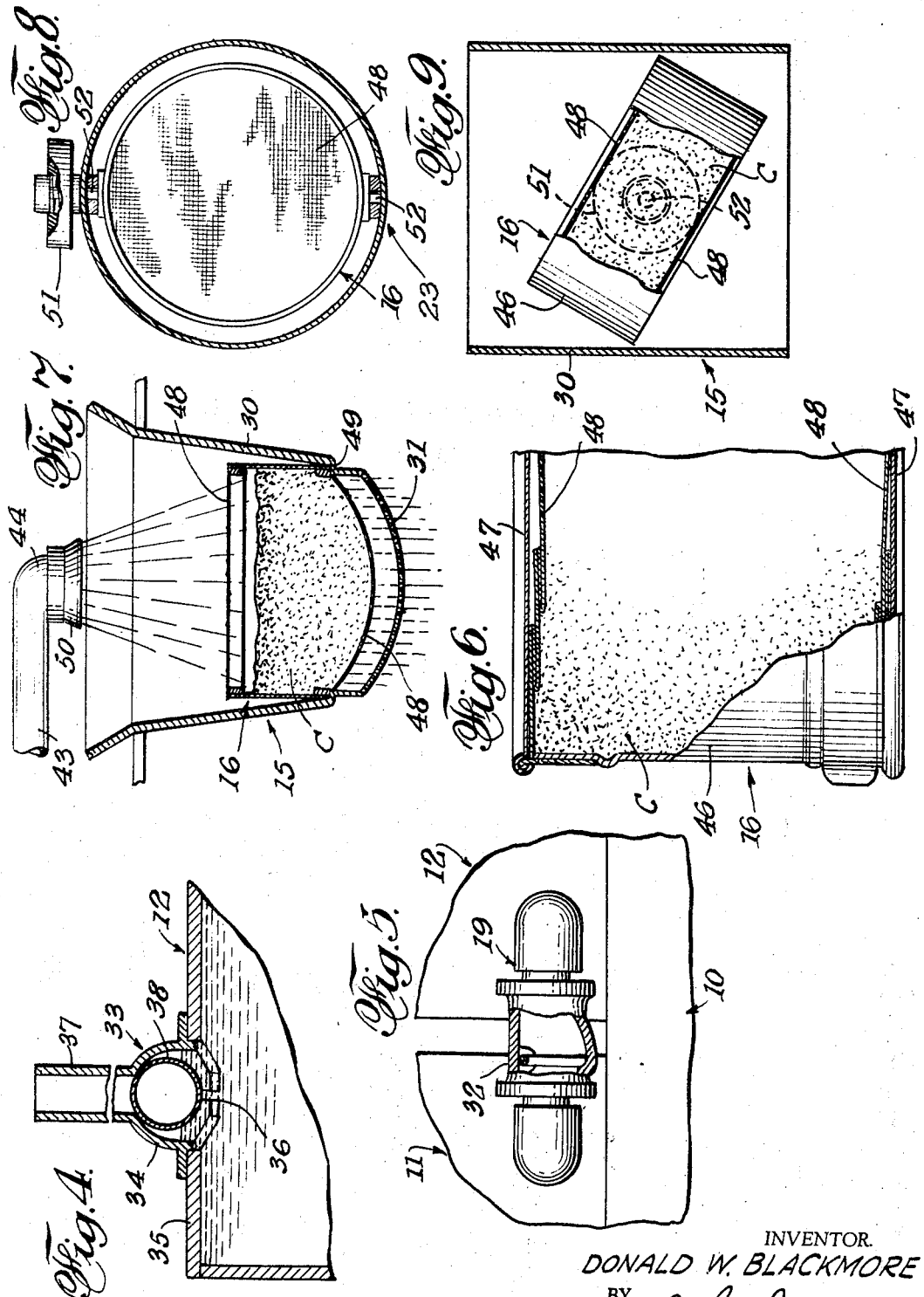

3,424,075
BREWING APPARATUS
Donald W. Blackmore, 3702 La Colmena Way,
Los Alamitos, Calif. 90720
Filed Apr. 10, 1967, Ser. No. 634,407
U.S. Cl. 99—298      7 Claims
Int. Cl. A47j *31/04*

ABSTRACT OF THE DISCLOSURE

Coffee-brewing apparatus having a water reservoir with two urns therein and a hopper above each urn to hold an opened can of ground coffee in position for hot water to pass therethrough, the resultant liquid coffee entering the urn with a coffee can thereabove. A heating container, with venting valves at each end, having a standpipe extending upwardly from the middle thereof to conduct hot water from said container, when said container is full of water, to said hopper when, due to applied heat, the pressure builds up therein to force water into the standpipe. Upon a predetermined low level being reached in the container, steam vents through the standpipe, lowering pressure and causing vent valves to open, then the revervoir, by gravity and through a connection with a check valve, refills the container. The standpipe may be moved to supply water to one or the other of said urns, as desired, or to return the hot water to the reservoir in a recirculating manner.

BACKGROUND OF THE INVENTION

The present apparatus, while capable of operating as a fixed installation, is particularly devised for use on trucks that purvey food and drink to commercial areas, it being an object of the invention to provide means that compensates for nonlevel conditions which may be encountered by such trucks, that requires only the application of heat to carry out its cycle of operation, such heat being advantageously provided by butane gas ordinarily used in certain vehicles for heating purposes, and is capable of providing a constant supply of coffee with but little attention, or as little as may be required at various times, thereby insuring brewed coffee that is fresh at all times.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The present coffee-brewing apparatus comprises, generally, a stand 10; a water reservoir 11, and a water-heating container 12 mounted on said stand, the latter in front of the former; means 13 housed in said stand to heat water in the reservoir 11 and coffee in the container 12; at least one urn 14 and preferably two, as shown, mounted in the upper portion of the reservoir; a combined hopper and holder 15 for cans 16 of ground coffee disposed in the upper end of each urn 14; an outlet flow pipe 17 extending from the bottom of each urn and terminating in a dispensing spigot 18 at the front of the container 12; a flow connection 19 from the bottom of the reservoir 11 to the lower portion of said container; automatic venting means 20 for the upper portion of said container 12; a standpipe 21 for conducting water from the container 12 to that one of the urns 14 the hopper 15 of which is provided with an open can of ground coffee 16; and means 23 to mount the can 16 for inversion movement, top-for-bottom, so that water from the standpipe 21 may pass through the can first in one direction, then in the other.

In the drawings, like reference characters designate similar parts in the several views.

BRIEF DESCRIPTION OF THE DRAWINGS

FIG. 1 is a vertical sectional view of coffee-brewing and dispensing apparatus according to the invention.

FIG. 2 is a top plan view, partly in section, of said apparatus.

FIG. 3 is an enlarged sectional view as taken on the line 3—3 of FIG. 2.

FIG. 4 is a fragmentary and enlarged sectional view of one of the venting valves of the automatic venting means.

FIG. 5 is a similar view of the flow connection between the reservoir and the heating container of the apparatus.

FIG. 6 is an enlarged and fragmentary sectional view of one form of coffee-containing can adapted for use in the present apparatus.

FIG. 7 is an enlarged vertical sectional view of the combined hopper and can holder shown in FIG. 1.

FIG. 8 is a plan view showing a mount for turning a coffee can top-for-bottom.

FIG. 9 is a vertical sectional view thereof.

DESCRIPTION OF THE PREFERRED EMBODIMENTS

The stand 10 may be of any suitable form and of a height from a support surface 25 to accommodate a receptacle 26 for receiving coffee dispensed by the apparatus. The heating means 13 is shown as gas pipes, in this case butane burners because this gas is readily suppliable to an automotive truck.

The reservoir 11 is shown as a rectangular container of substantial height and siutable capacity, for instance, thirty-five gallons, which will serve for ten coffee-brewing cycles. The same may be filled in any suitable way, preferably on a day-by-day basis. A vent 27 permits filling and gravity flow from the reservoir through the connection 19 to the container 12.

Said container 12 is also rectangularly shaped and is substantially smaller than the reservoir, the same having a capacity of about seven gallons. Where the pipes 17 pass through the container 12, a tunnel or passage 28 is formed therein so the pipes, as shown in FIG. 3, do not pass through the interior of the container. In this case, a cabinet 29 is mounted upon the container 12. The same may be shelved to store items that may be kept warm under the heat issuing from the container 12.

Each urn 14 comprises a container and may follow ordinary design of such items in conventional coffee-brewing machines. The mentioned pipe 17 conducts the output from said urn, as controlled by a spigot 18.

The combined hopper and can holder 15 comprises a top-open receptacle 30 which may be as large as required and having a perforated bottom 31. As shown, said receptacle is designed to support a coffee can 16. The details of said can and its variations will be later described, it being essential, however, that both the top and bottom of the can be open to flow of water and that the same be provided with filter covers for said top and bottom to hold the grounds in the can but still pass steeped coffee through the bottom 31 into the urn 14.

The flow connection 19 is provided with a check valve 32 that provides for free flow of water, by gravity, from the reservoir 11 to the lower portion of the water-heating container 12. When the pressure in the latter exceeds the pressure of the head in the reservoir, said valve automatically closes, thereby preventing reverse flow to the reservoir.

The automatic venting means 20 is shown as two check float valves 33 at each end of the top of the container 12. Thus, regardless of the level or slanted disposition of the truck mounting the present apparatus, both said valves 33 will close only when the container 12 is completely filled. Each said valve 33 comprises a housing 34 mounted in the top wall 35 of said container and having a lower stop 36 that is open to the interior of said container, an upper port 37 that vents to atmosphere, and a buoyant float 38 that normally is supported by the housing 34, is buoyed by air seeking egress through stop 36 from the container when being filled, and is floated by the water, as it fills the container, to close the venting port 37. The port 37 may extend upwardly so a head of condensate may collect therein to cause the buoyant float to be moved from sealing port 37.

The standpipe 21 is shown as a vertical tube 39 that is rotationally mounted with its lower end 40 extending through the container top 35 into the interior of said container 12. The level 41 at the end of said end 40 determines the amount of water required to fill the container, as above, after each brewing cycle. Said standpipe 21 extends upwardly through the cabinet 24 and terminates in a closed upper end 42. Said tube is preferably located at the transverse middle of the container 12 and midway between the urns 14, if two are used, as shown. In such case, the tube 39, above the top of the cabinet 29, is provided with a lateral flow-conducting arm 43 that may be swung so its downturned discharge end 44 is in register with the hopper 15 of one or the other urn. A bypass bleed line 45 from said tube 39 extends below the arm 43 in position to discharge into the container 29 of one or the other urn 14, according to the swung position of the standpipe.

By locating the tube or pipe 39 centrally between the front and back, and end walls of the container 12, and locating the opening in the pipe end 40 centrally between the top and bottom of said container, the same amount of water is transferred from said container 12 through the standpipe 21, and over the ground coffee, for all level and nonlevel dispositions of the truck and, therefore, of the apparatus. In other words, the opening in said pipe end 40 is at a central point with respect to all of the walls of the container.

The can of ground coffee 16 may be formed in various ways. Essentially, the same comprises a body 46 provided with covers 47 at opposite sides. Inward of the covers 47 are provided filters 48 of paper, metal, fabric or other suitable filtering material, and which may extend tautly across the opposite sides of the body or be folded or creased so that, when released, the same may bulge or distend outwardly to cause enlargement of the inside of the can. Thus, the ground coffee in the body between the filters may become loosened and better conditioned for releasing the coffee essence to water passing therethrough. It will be understood that a perforated membrane of paper, cloth or metal, constitutes liquid-filtering means comparable to a tautly applied filter, as above.

Such a can 16, after the covers 47 are removed, may be placed in either hopper 15, as upon a support ledge 49, so that water discharged from a nozzle 50 on the end of arm 43 will pass through the ground coffee C, through the lower filter 48 of said can, and through the hopper bottom 31 into the urn 14.

As shown in FIGS. 8 and 9, the can 16 may be mounted by means 23 so it may be turned or inverted in a manner to allow water from the standpipe to pass through the ground coffee C in opposite directions alternately. The can may be moved in this manner, as shown, as by a knob 51 on the mounting means 23. To this end, the can is removably mounted on trunnions 52, one of which may be retracted to allow ready removal and replacement of a can with spent grounds by a fresh can.

OPERATION

At the end of a brewing cycle, the water in the container 12 is at the level 41 and the space thereabove is at atmospheric pressure. Therefore, said container will fill with water that flows from the reservoir 11 past the check valve 32 and fills said space as the float valves vent the same. The heating means 13 is in operation and can be set to control the temperature in the container and, thereby, vary the quantity of water that will be pumped in a given time. The amount of water that is being pumped is controlled by the depth of the end 40 of the standpipe in the water.

The pumping pressure in the container does not begin to build up until the same is filled and the valves 33 closed, as shown in FIG. 4. As an example, a good formula for controlling the pumping rate is to so regulate the heating means 13 as to cause a rise of the temperature of the water in the container 12 of about 3½° F. per minute, so as to pump three and one-half gallons in three and one-half minutes. This hot water, under pressure in the container 12, will rise in the standpipe 21 and discharge over a can 16 in the hopper 15. By allowing three and one-half minutes for the water in hopper 15 to seep through the coffee 49, the brew that enters the urn 14 is the brew that is dispensed through the pipe 17. When the desired brew is achieved in the urn, the standpipe arm 43 may then be shifted to the other urn and coffee brewed therein in the manner above described.

Depending on the amount of such brewed coffee being dispensed over given time periods, the rate at which the brewing cycles are carried out will vary. If the water in the reservoir is maintained at about 160° F., the discharge of the same into the container 12 will result in water in said container at 186° F. The cycle will start or restart by applying heat for seven to ten minutes. In the meantime, brewed coffee, as needed, may be drawn off through one or the other spigot 18. If sufficient coffee has been brewed for current needs, the standpipe may be set to discharge into the reservoir, causing a simple repeating cycle operation circulating the water back into the reservoir.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. Coffee-brewing apparatus comprising:
   (a) heating means,
   (b) a water resorvoir,
   (c) at least one coffee urn provided with a hopper for supporting a can of ground coffee with a filter enclosing the coffee on opposite sides of the can,
   (d) a water container connected to said reservoir to receive water therefrom by gravity when the pressure in said container is lower than the head of the water in the reservoir, and
   (e) means to conduct water from said container to said hopper for discharge onto the can whereby said water passes through the ground coffee therein and through the filters thereof and enters the urn for eventual dispensing therefrom,
   (f) the water container being of elongated form and provided, at each end, with float-controlled venting valves that close when the supply of water from the reservoir fills the container, thereby closing the container so that continued application of heat produces a water-displacing pressure, the mentioned water-conducting means being open to the resultant flow of pressure-impelled water.

2. Coffee-brewing apparatus according to claim 1 in which the water-conducting means comprises a standpipe located at the middle of the container and having a lower end that extends downwardly from the top of the container, a lateral water-conducting arm on the upper end of the standpipe, the latter being swingably adjustable to discharge water, selectively, into the mentioned hopper, and a second transversely spaced hopper.

3. Coffee-brewing apparatus according to claim 2 provided with a water-bypassing tube on the standpipe and directed to discharge into the urn in the hopper of which the lateral arm discharges.

4. Coffee-brewing apparatus according to claim 1 provided with a spigot-controlled dispensing pipe extending from the lower end of each said urn, the container having a transverse tunnel formed therein for passage therethrough of said pipe.

5. Coffee-brewing apparatus according to claim 1 in which an opening in the top of the reservoir, offset from each urn, is adapted to receive water discharged from the standpipe to return the same to the reservoir for re-circulating the water heated in the container.

6. Coffee-brewing means according to claim 1, provided with means to mount said can, a pivot between said means and the hopper so the mounting means and the can may be turned to present the filters to the water flow, alternately, and a knob, outside the hopper, connected to the pivot for turning said means and the can mounted thereon.

7. In a coffee-brewing apparatus according to claim 1, the means to conduct water from said container to said hopper comprising a standpipe having a lower end that is centrally located with respect to all of the walls of said water container to, thereby, transfer the same amount of water to the water-conducting means in all angular positions of the apparatus.

References Cited

UNITED STATES PATENTS

| | | | |
|---|---|---|---|
| 1,412,388 | 4/1922 | Clermont | 99—295 |
| 1,863,710 | 6/1932 | Berg | 99—298 |
| 2,360,194 | 10/1944 | Bright | 99—291 |
| 3,083,101 | 3/1963 | Noury | 99—295 X |

ROBERT W. JENKINS, *Primary Examiner.*